US008897461B1

(12) United States Patent
Wiewiora

(10) Patent No.: US 8,897,461 B1
(45) Date of Patent: Nov. 25, 2014

(54) DENOISING AN AUDIO SIGNAL USING LOCAL FORMANT INFORMATION

(75) Inventor: Eric Wiewiora, San Diego, CA (US)

(73) Assignee: The Intellisis Corporation, San Diego, CA (US)

( * ) Notice: Subject to any disclaimer, the term of this patent is extended or adjusted under 35 U.S.C. 154(b) by 635 days.

(21) Appl. No.: 13/097,627

(22) Filed: Apr. 29, 2011

Related U.S. Application Data

(60) Provisional application No. 61/329,816, filed on Apr. 30, 2010.

(51) Int. Cl.
*H04B 15/00* (2006.01)

(52) U.S. Cl.
USPC ....... 381/94.1; 381/94.2; 381/94.3; 381/94.4; 381/71.1; 704/226; 379/392.01

(58) Field of Classification Search
USPC .................... 381/94.1, 94.4, 94.2, 94.3, 71.1; 704/226, 227, 228; 379/392.01
See application file for complete search history.

(56) References Cited

U.S. PATENT DOCUMENTS 5,687,240 A * 11/1997 Yoshida et al. ................. 381/61

* cited by examiner

*Primary Examiner* — Paul S Kim
(74) *Attorney, Agent, or Firm* — Pillsbury Winthrop Shaw Pittman LLP

(57) ABSTRACT

A system, method, and computer program product are provided for cleaning an audio segment. For a given audio segment, an offset amount is calculated where the audio segment is maximally correlated to the audio segment as offset by the offset amount. The audio segment and the audio segment as offset by the offset amount are averaged to produce a cleaned audio segment, which has had noise features reduced while having signal features (such as voiced audio) enhanced.

5 Claims, 4 Drawing Sheets

100

DENOISING AN AUDIO SIGNAL USING LOCAL FORMANT INFORMATION

CROSS-REFERENCE TO RELATED APPLICATIONS

The present application claims the benefit of U.S. Provisional Application No. 61/329,816, filed Apr. 30, 2010, entitled "Denoising an Audio Signal Using Local Formant Information," which is incorporated herein by reference in its entirety.

BACKGROUND OF INVENTION

1. Field of the Invention

The present invention relates generally to audio processing and, more particularly, to noise reduction of speech audio.

2. Description of the Background Art

Noise reduction in audio signals has approximately a fifty year history. Early analog methods for performing this task relied on amplification of the desired signal relative to the inevitable background noise. This was accomplished by selectively amplifying frequency bands that are most susceptible to noise, and later reducing the amplification for playback (see the work of Dolby). In order for this approach to work, special recording and playback equipment must be used.

Modern approaches to noise reduction primarily use a time-frequency (e.g. spectrogram) approach. In these approaches, an audio signal is first decomposed into frequency bands. Next, the frequency of the noise component of the signal is analyzed. This frequency component is then subtracted out of the signal. The signal is then reconstructed, with the frequency components of the noise removed. This approach is good at removing noise, but also damages portions of the desired voice signal. This is more pronounced at higher frequencies, giving the denoised audio a "muffled" quality.

Accordingly, what is desired is a denoising mechanism that does not noticeably affect voice signal quality.

SUMMARY OF INVENTION

Embodiments of the invention include a method comprising calculating an offset amount for an audio segment where the audio segment is maximally correlated to the audio segment as offset by the offset amount, averaging the audio segment and the audio segment as offset by the offset amount to obtain a cleaned audio segment, and outputting the cleaned audio segment.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
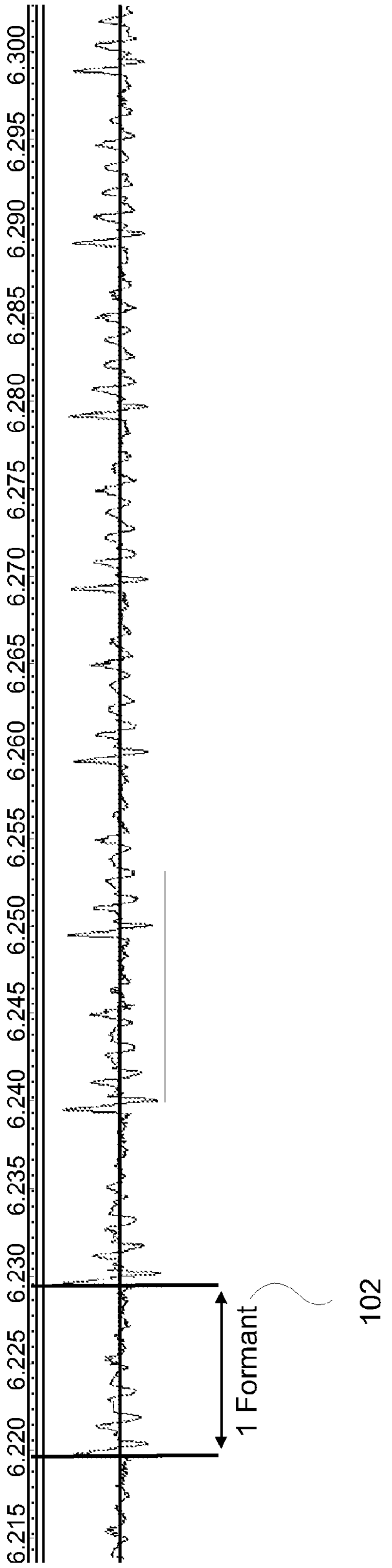
FIG. 1 illustrates a time-domain segment of voiced audio, in accordance with an embodiment of the present invention.

The present invention will now be described with reference to the accompanying drawings. In the drawings, generally, like reference numbers indicate identical or functionally similar elements. Additionally, generally, the left-most digit (s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, it would be apparent to one of skill in the art that the present invention, as described below, can be implemented in many different embodiments of software, e, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Noise reduction is a significant problem when performing signal processing. Noise reduction techniques need to account for damage to signal components by the technique. For example, with speech, most of the relevant signal is carried at a particular frequency and harmonics of that frequency. Noise reduction techniques that cannot avoid signal loss at, for example, the harmonic frequencies, inevitably damage the speech signal. Techniques for improved noise reduction without significant damage to a desired signal component are presented herein in the context of speech signals, although one skilled in the relevant arts will appreciate that the techniques can be applied to other signal processing areas.

Existing techniques commonly perform noise reduction by decomposing the signal into spectral bands, identifying noise components within those spectral bands, and cancelling the noise at a particular frequency. In accordance with an embodiment of the present invention, instead of decomposing the signal into spectral bands, the signal is cleaned directly in its original form. This is accomplished, in an exemplary non-limiting embodiment of voiced audio, by exploiting the fact that voiced audio is highly repetitious on a local scale, while the noise is not.

In voiced audio, the relevant signal is carried in a particular frequency and the harmonics of that frequency. As a result, a majority of speech audio is transmitted through waves aligned with a speaker's corresponding F0 formant. As used herein, the term formant refers to a spectral peak of the sound spectrum of a speaker's voice, although one skilled in the relevant arts will appreciate that spectral peaks and other features of voice and non-voice audio signals may be substituted wherever formants are referenced herein. Using an autocorrelation technique, it is possible to track the F0 formant. Portions of the audio signal which are coherent with the F0 formant are amplified, while portions that are not coherent are dampened. This procedure is done by locally averaging of portions of the audio signal of a length equal to one period of the F0. As a result, speech portions of the audio signal are amplified, while all else, including noise, is dampened.

II. Voiced Speech Characteristics

FIG. 1 illustrates a time-domain segment of voiced audio 100, in accordance with an embodiment of the present invention. A segment 102 of voiced audio 100 corresponds to one period of the F0 formant for the speaker. As can be seen in voiced audio 100, additional segments along the timeline are highly repetitious of the signal carried in segment 102.

In accordance with an embodiment of the present invention, voiced audio 100 depicts a single vowel sound or other vocalization by a speaker. By way of example, and not limitation, when a speaker utters a long 'o' sound, alone or as part of a conversation, the sound has repetitious components for its duration. Note that in the exemplary scale shown for voiced audio 100, a single formant is only approximately 10 ms in length.

Other audio signals may exhibit similar characteristics to voiced audio 100, having repetitious characteristics at a local level. Software used to process these audio signals can read in the audio signals as an input stream, such as from a file or a real-time source (e.g., a broadcast stream), and output a processed version having voice signal components enhanced and non-voice signal components (e.g., noise) diminished, in accordance with an embodiment of the present invention.

III. Signal Correlation

As noted above, portions of the audio signal which are coherent with the F0 formant are amplified, while portions that are not coherent are dampened. This is accomplished by first dividing the audio signal into discrete clips for processing, in accordance with an embodiment of the present invention. This division may be exclusive, or may result in overlapping chunks of audio. By way of example, and not limitation, a common length of a clip of the audio signal is 10 ms, corresponding to 80 samples of a digital audio source having a sample rate of 8 kHz.

Next, an offset is determined, within a certain range corresponding to a range of frequencies, where the current clip is maximally correlated to the offset clip, in accordance with an embodiment of the present invention. In voice applications, by way of example and not limitation, the range of frequencies where maximal correlation is likely to occur is between 80 Hz and 600 Hz, which match the normal range of the F0 formant in human speech. As a result, a search for the maximally correlated offset can be limited to these frequencies in order to improve processing, in accordance with an embodiment of the present invention.

For other applications, the range of frequencies that should be searched depends on the nature of the signal to be emphasized. In general, any frequency range works as long as the frequencies are low with respect to the sampling rate. By way of example, and not limitation, correlation is best performed for frequencies as high as $1/10^{th}$ the sampling rate (e.g. 800 hz for an 8 khz sampling rate), although it is possible to utilize frequencies closer to the sampling rate.

Figure 2:
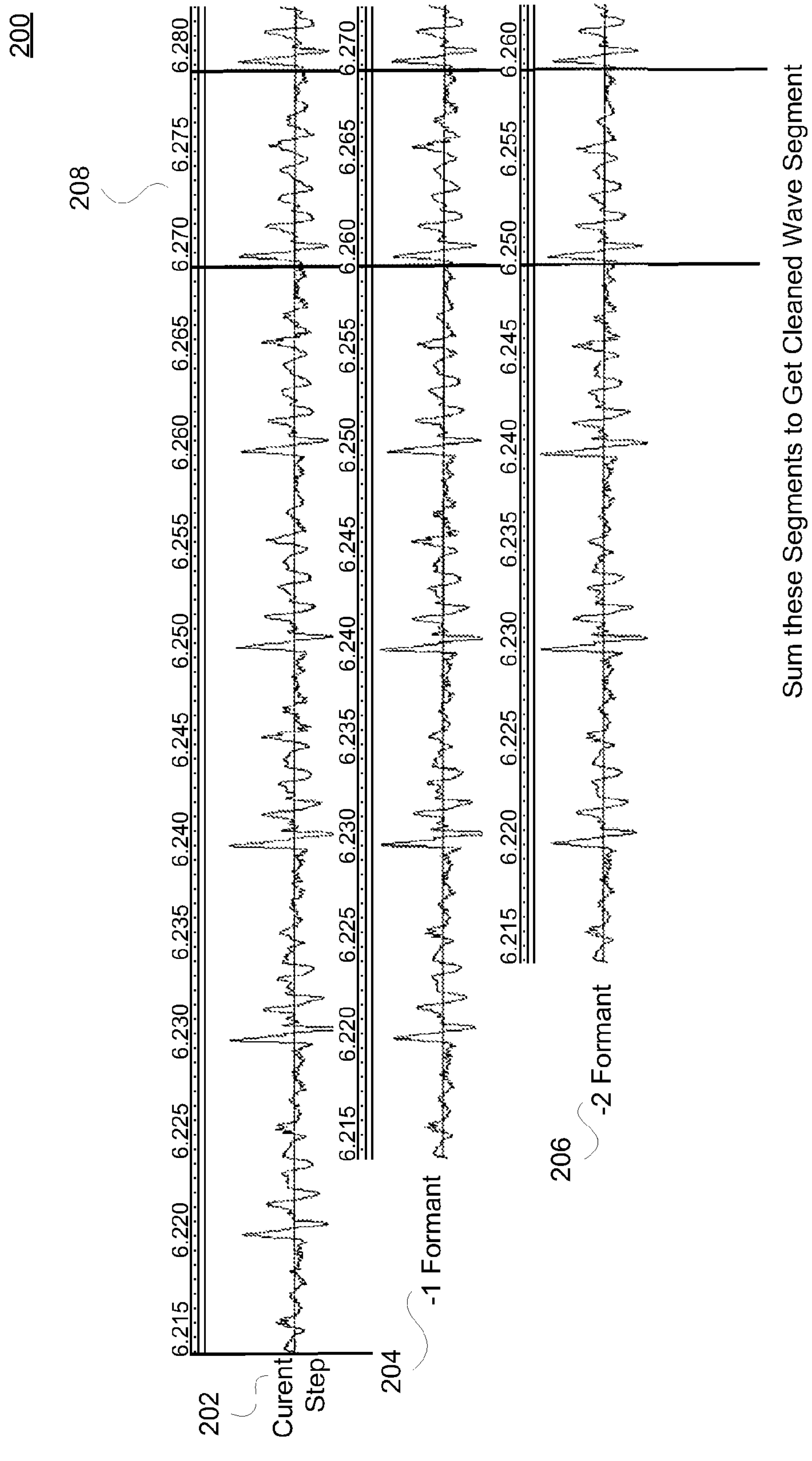
FIG. 2 illustrates time-domain segments of voiced audio offset by an offset amount to obtain maximal correlation, in accordance with an embodiment of the present invention.

FIG. 2 illustrates time-domain segments of voiced audio 200 offset by an offset amount to obtain maximal correlation, in accordance with an embodiment of the present invention. One skilled in the relevant arts will recognize that maximal correlation need to refer to the absolute maximum correlation that can be obtained from a signal and its offset, but can also refer to a maximum based on analysis at discrete offset steps (e.g., discrete time offsets of 1 ms, or discrete sample offsets of 1, 5, or 10 samples).

Segment 202 is offset by one formant to obtain offset segment 204, in accordance with an embodiment of the present invention. Determining the offset to apply to offset segment 204 can be accomplished through a number of different techniques, as will be understood by one skilled in the relevant arts, although one technique involves the offsetting of offset segment 204 relative to segment 202, determining a correlation factor, and repeating with a different offset to obtain another correlation factor. These correlation factors are compared, and the offset having the highest correlation factor is treated as a new candidate for the maximal correlation offset.

This offsetting and correlation determination can be repeated, as necessary, for a range of offsets to determine a maximally correlated offset for a given range of offsets, in accordance with an embodiment of the present invention. In the case of voiced audio, this offset will generally correspond, as shown in FIG. 2, to a formant length.

Segment 202 can again be offset to determine another maximal correlation offset, as shown in offset segment 206, in accordance with an embodiment of the present invention. This can be repeated to obtain a desired noise cancellation and averaging effect, although the number of formants averaged in FIG. 2 and throughout this disclosure is three, by way of example, and not limitation. One skilled in the relevant arts will appreciate that the number of formants averaged can be changed for any particular application.

Portions of segments 202, 204, and 206 corresponding to a maximally correlated segment (i.e., a formant in voiced audio applications) as summed together 208 to obtain a cleaned wave segment.

IV. Correlation Implementation

Figure 3:
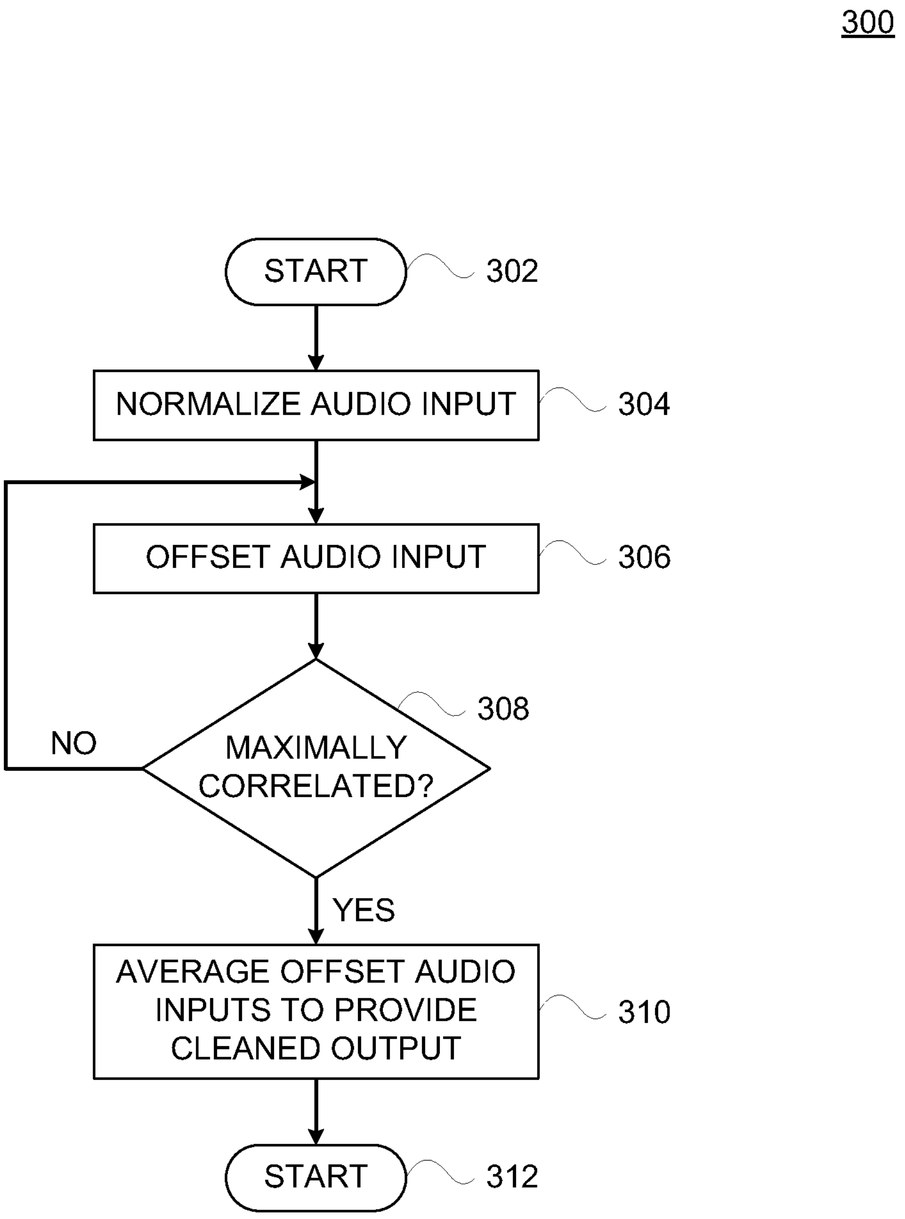
FIG. 3 is a flowchart 300 illustrating steps by which to perform correlation of the audio inputs to provide cleaned audio output, in accordance with an embodiment of the present invention.

FIG. 3 is a flowchart 300 illustrating steps by which to perform correlation of the audio inputs to provide cleaned audio output, in accordance with an embodiment of the present invention. The method begins at step 302 and proceeds to step 304 where the audio sample is normalized, in accordance with an embodiment of the present invention. This can be used to guarantee, by way of example and not limitation, that all data appears within a scalar value range of −1.0 to +1.0, although one skilled in the relevant arts will appreciate that the step of normalization and its precise implementation may vary among applications.

At step 306, the audio input, for example audio input 202 of FIG. 2, is offset to compute an offset audio sample (e.g., offset audio sample 204 of FIG. 2), in accordance with an embodiment of the present invention. Assume for example that the entire source audio signal is referenced by the term a, and each digital sample comprising audio signal a is referenced by $a_1$ to $a_T$. Audio signal a is divided into potentially overlapping chunks $a_{t(i):t(i+1)}$ where t(i) corresponds to evenly spaced points in audio signal a, in accordance with an embodiment of the present invention.

For each audio chunk, the offset with maximum correlation is determined, in accordance with an embodiment of the present invention. In accordance with a farther embodiment of the present invention, this offset is determined from a given range of potential offsets, as described above. An exemplary, non-limiting calculation is provided by:

$$O=\text{argmax}_o(\text{corr}(a_{t(i):t(i+1)},a_{t(i-o):t(i+1-o)}))$$

This offset corresponds to a particular frequency, in accordance with an embodiment of the present invention. Specifically the frequency for an offset, O, provided in terms of a sample number, is the sample rate divided by offset O. As noted above, in speech applications, the offset with maximum correlation will almost always correspond to the fundamental frequency, and therefore each sample will be offset by a formant.

In the above calculation, the maximum correlation provided by $\text{argmax}_o$ is computed by calculating correlations between a number of samples. The correlation function used in the above calculation is provided, in an exemplary non-limiting embodiment, by:

$$\text{corr}(a,b)=(2*a^Tb)/(a^Ta+b^Tb)$$

where $a^T$ and $b^T$ refer to the transpose of the input data sample vectors.

In the above example, the ‘a’ and ‘b’ parameters to the ‘corr’ function are provided by $a_{t(i):t(i+1)}$ and $a_{t(i-o):t(i+1-o)}$, respectively. However, in practice, $a^Ta$ and $b^Tb$ for these inputs will be approximately equal, allowing for the cancellation of the 2 in the numerator of the exemplary fraction. The correlation function can therefore be simplified for processing, in at least the case of voice signal processing, by the exemplary non-limiting function:

$$\text{corr}(a,b)=a^Tb/a^Ta$$

At step 308, a determination is made as to whether a best, maximally correlated offset has been found, in accordance with an embodiment of the present invention. If the maximally correlated offset has not been identified, then the method repeats at step 306, where a correlation, provided by corr(a,b), is determined for a different offset value.

If the maximally correlated offset has been found, a check is made to determine whether the correlation is above some threshold (e.g., 0.4 in an exemplary non-limiting embodiment), in accordance with an embodiment of the present invention. If so, then it is assumed that the current audio chunk contains desired signal.

This desired signal is then emphasized by averaging the audio at step 310 over several multiples of the preferred offset, as in the segment averaging 208 of FIG. 2, in accordance with an embodiment of the present invention. This has the effect of emphasizing the portions of the audio signal that are correlated with the fundamental frequency, while cancelling out portions of the audio signal that are not correlated (e.g., noise components within the same segment 208, which may be present in one formant but not in another). The method then ends at step 312.

The below exemplary non-limiting code sample illustrates a particular implementation of the correlation process described in flowchart 300 of FIG. 3, in accordance with an embodiment of the present invention.

First, an input signal is obtained and normalized:

```
for (headerInd = minsart; headerInd < streamLen;
headerInd+=hopLen
{
   bestgap = 0;
   maxCorr = 0.0;
   headerNorm = 0.0;
   headptr = instream + headerInd;
   for (k = 0; k<windowsize; k++)
   {
      temp = *headptr;
      headerNorm += temp*temp;
      headptr−−;
   }
   trailingInd = headerInd − mingap;
```

Then, for each portion of the audio signal, a set of candidate offset frequencies are considered, with a correlation between the current audio portion and the candidate offset (e.g., a formant period) calculated for each candidate offset:

```
   for (j = 0; j <numCorrCoeffs; j++)
   {
      trailptr = instream + trailingInd;
      headptr = ipstream + headerInd;
      curCorr = 0.0;
      for (k = 0; k<windowsize; k++)
      {
         curCorr += (*trailptr) * (*headptr);
         headptr−−;
         trailptr−−;
      }
```

If the current offset/formant has higher correlation than the previous offset having the highest correlation, then it is deemed to be the current maximum correlation formant, as shown by:

```
   curCorr = curCorr/ (headerNorm+EPS);
   if(curCorr > maxCorr)
   {
      maxCorr = curCorr;
      bestgap = j+mingap;
   }
   trailingInd−−;
}
```

By way of example, and not limitation, if the current offset, given by “j+mingap”, has a higher correlation, given by “curCorr”, than the current maximum correlation “maxCorr” for offset “bestgap”, then “j+mingap” becomes the new maximally correlated offset, and the corresponding data is assigned as the new “maxCorr” and “bestgap”. At the end of the FOR loop processing, these variables will contain information regarding the maximally correlated offset.

Subsequently, for each offset repetition, the current output signal is added to the input signal, delayed by a repetition of the maximally correlated offset, in accordance with an embodiment of the present invention. This is shown by the following non-limiting exemplary code:

```
        if (bestgap != 0)
        {
          for (j = 0; j<=FORMANTCOPIES; j++)
          {
            outptr = outstream+headerInd;
            trailptr = instream + headerInd– (j) *bestgap;
            for (k = 0; k<hopLen; k++)
            {
              *outptr = *outptr + (*trailptr);
              outptr––;
              trailptr––;
            }
          }
        }
      }
      return outstream;
```

For the example shown in FIG. 2, the term "FORMANT-COPIES" is equal to three, indicating that three correlated offsets will be used to compute the average, cleaned ouput.

Additionally, as shown above, and as provided by step 310 of FIG. 3, the cleaned output given by "outptr" is normalized, in accordance with an embodiment of the present invention. In the above example, the code:

*outptr=*outptr+(*trailptr);

is used to add all of the correlated formants. Subsequent normalization code, not shown, can then be applied, which has the effect of averaging the summed formants, in accordance with an embodiment of the present invention.

In an alternative embodiment of the present invention, the code:

*outptr=*outptr+maxCorr*(*trailptr);

may be substituted for the previous code used to add all of the correlated formants. This non-limiting exemplary code scales the contribution of the formants being added based on their correlations, such that weaker correlations will have less of an averaging effect on the cleaned output. One skilled in the relevant arts will appreciate that other methodologies for balancing the contributions of each formant may be utilized, and the above are presented by way of example, and not limitation.

V. Example Computer System Implementation

Figure 4:
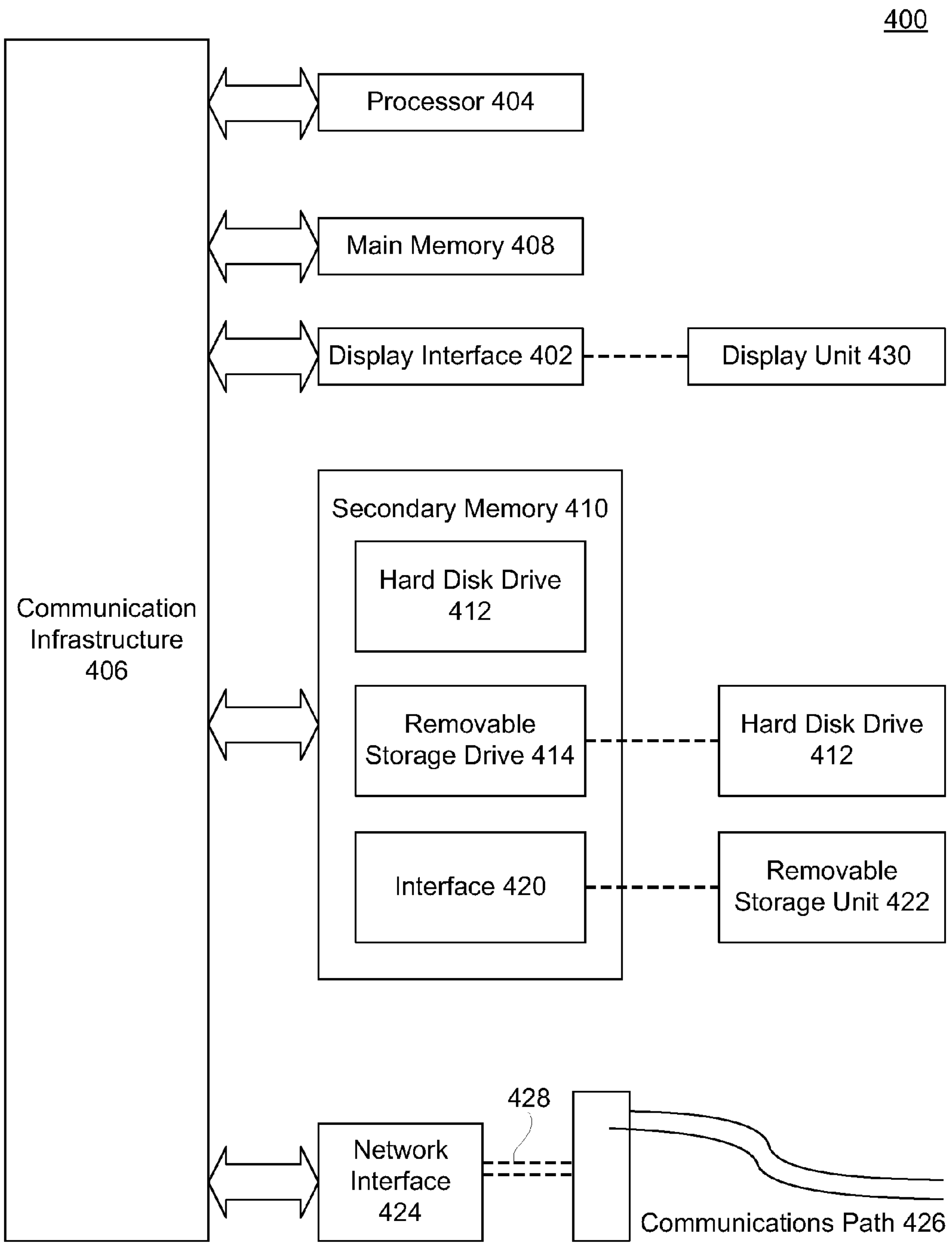
FIG. 4 depicts an example computer system in which embodiments of the present invention may be implemented.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by flowchart 300 of FIG. 3 can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. that is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 that allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals that may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the steps in the methods illustrated by flowchart 300 of FIG. 3, discussed above. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method to reduce noise in audio, wherein the method is implemented in a computer system that includes one or more physical processors and physical electronic storage, the method comprising:

obtaining an audio segment that represents voiced audio, wherein the audio segment includes multiple samples having a sample duration;

determining, by the one or more processors, for individual ones of a set of offsets that delay the audio segment, a correlation between the audio segment and an individual one of a set of delayed audio segments;

selecting a particular offset from the set of offsets, wherein the particular offset corresponds to a greater correlation than other offsets from the set of offsets;

determining a particular delayed audio segment based on delaying the audio segment by the particular offset;

averaging the audio segment and the particular delayed audio segment to obtain a cleaned audio segment; and outputting the cleaned audio segment.

2. The method of claim 1, wherein individual ones of the set of offsets span one or more sample durations.

3. The method of claim 1, further comprising:

determining a second delayed audio segment based on delaying the audio segment by a multiple of the particular offset, wherein the cleaned audio segment is obtained by averaging the audio segment, the particular delayed audio segment, and the second delayed audio segment.

4. The method of claim 3, wherein the particular delayed audio segment has a particular correlation with the audio segment, the method further comprising:

determining a second correlation between the audio segment and the second delayed audio segment;

wherein the step of averaging the audio segment, the particular delayed audio segment, and the second delayed audio segment is performed such that the particular delayed audio segment is weighted based on the particular correlation, and further such that the second delayed audio segment is weighted based on the second correlation.

5. The method of claim 1, wherein the audio segment spans 10 ms, wherein the audio segment includes 80 samples having a ⅛ ms duration.

* * * * *